Dec. 15, 1959 A. DE PALMA ET AL 2,917,332
JOINT FOR UNITING THREE STRUCTURE MEMBERS
IN SHELVINGS AND SCAFFOLDINGS
Filed Oct. 23, 1957 3 Sheets-Sheet 1

Inventors:
Ambrogio De Palma
and Bruno Viscardi
by: Michael S. Striker
Attorney

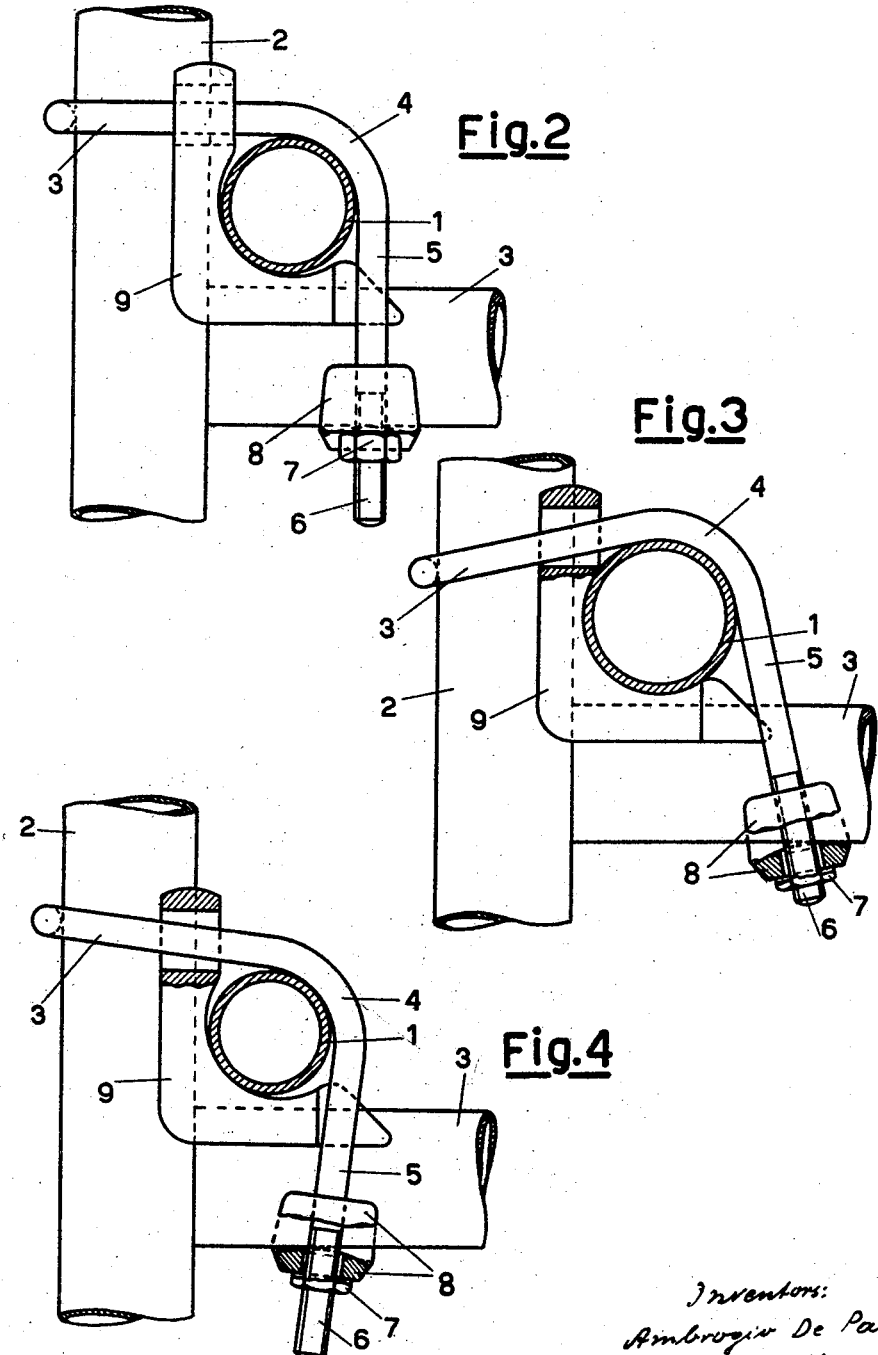

United States Patent Office 2,917,332
Patented Dec. 15, 1959

2,917,332

JOINT FOR UNITING THREE STRUCTURE MEMBERS IN SHELVINGS AND SCAFFOLDINGS

Ambrogio De Palma and Bruno Viscardi, Milan, Italy

Application October 23, 1957, Serial No. 691,975

Claims priority, application Italy October 25, 1956

8 Claims. (Cl. 287—54)

It is an object of the present invention to provide a joint for uniting with one another three structure members of a shelving or scaffolding, which are generally one vertical and two horizontal, but which may have even other inclinations, and of which at least one has round cross-section.

It is an object of the invention to provide a safe and quick locking by merely tightening two nuts against one same plane, the joint being composed of only three pieces, of course in addition to said tightening nuts.

The joint is constituted essentially by a U-bent rod with its parallel branches contained in a plane over a certain portion and then bent while remaining parallel to each other in a plane forming an angle with the former one; by an auxiliary piece shaped by way of a square to be introduced between the branches of the rod and provided at its faces with seats for supporting the structure members to be connected, and by a staple introduced and locked by means of nuts to be screwed onto the threaded ends of the rod.

Such a joint might be objected to on the ground of a belief that since the rod is not flexible as for instance a metal rope would be, the locking made according to only one direction might not afford reliability as to stabile connection of three structure members.

Now it has been found that on the contrary, since the shaped rod is susceptible of assuming an angular position with respect to the structure members which is variable within certain limits, it is possible to attain a locking of all three tubular structure members with great rigidity even if their dimensions involve comparatively wide allowances, whence it has turned out in practice that the simplicity of the joint, which constitutes its main advantage, does not by any means impair its effectiveness as compared with other much more complicated and costly joints as to manufacture and assembling.

In order better to explain the principle set forth hereinabove, reference will be made to a preferred embodiment illustrated merely by way of example without limitation in the accompanying drawing, wherein:

Figs. 2, 3 and 4 represent a view of the joint with one of the tubes having slightly different diameters;

Figure 1:
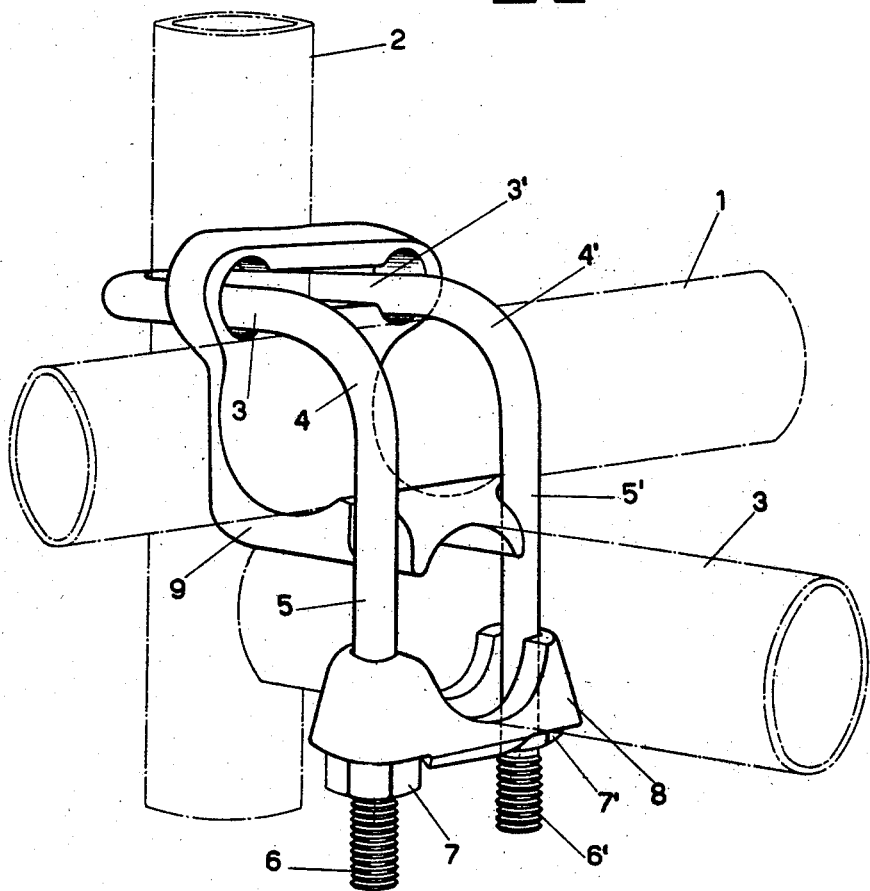
Fig. 1 represents a perspective view of the joint as applied to the particular case of tubular structure members.

In the example illustrated, the joint is constituted by a rod bent in U-shape in such a way as to embrace the first tube 2; the parallel branches 3, 3' of the rod are then bent at right angle radiused at 4—4' in such a way as to embrace the second tube 1 at its side and passing orthogonally with respect to the first one, the branches being terminated, again parallel with each other at 5, 5', by the threaded portions 6, 6' coupled with the nuts 7, 7' for the locking of the staple 8 upon the third tube 3 passing under the tube 1 and abutting against the tube 2.

In order to ensure better trim of the tubes in the joint and in order to prevent the tubes from deforming in the restricted zones of direct contact, there is provided a square-shaped removable piece 9 which can be introduced between the branches of the thread-like element, said piece being provided at its two faces with seats against which there rest respectively the tubes 1, 2 and 3. In the case illustrated, since the structures are tubular, the seats are shaped as cylindrical sectors.

In Figures 2, 3 and 4 is illustrated the behaviour of the joint if the tube 1 has respectively three diameters smaller than, equal to or larger than the theoretical predetermined diameter of the tubes to which the joint is destined.

As visible in the drawing, the shaped rod assumes in the three cases deviated position or non-deviated position, so as to obtain locking in a satisfactory manner.

The possibility of this behaviour is evidenced by Fig. 5 wherein the geometrical problem is plotted in the following manner.

Two parallel straight lines $a$ and $b$ being given which have a distance D from each other that is equal to the diameter of the tubes to be considered, a segment $m$ perpendicular to $a$ and having length equal to 2D, joined at its end to an indefinite segment $n$ perpendicular thereto, that is, parallel to $a$ and $b$, and considering the straight line $s$ perpendicular to $a$ and $b$ at the distance D from $m$, it will be seen that $b$, $m$, $n$, $s$ define a square in which a circle of diameter D can be inscribed.

Now, if this circle represents the cross-section of the tube 1 tangent to the generating lines $b$ and $s$ respectively of the tubes 2 and 3, one can examine how the diameter of that inscribed circle varies of the whole of the segments perpendicular to each other $m$ and $n$ is shifted while keeping the end of the segment $m$ on the straight line $a$ and inclined in such a way as always to obtain a symmetrical quadrilateral, that is a quadrilateral that can be circumscribed to a circle.

Figure 5:
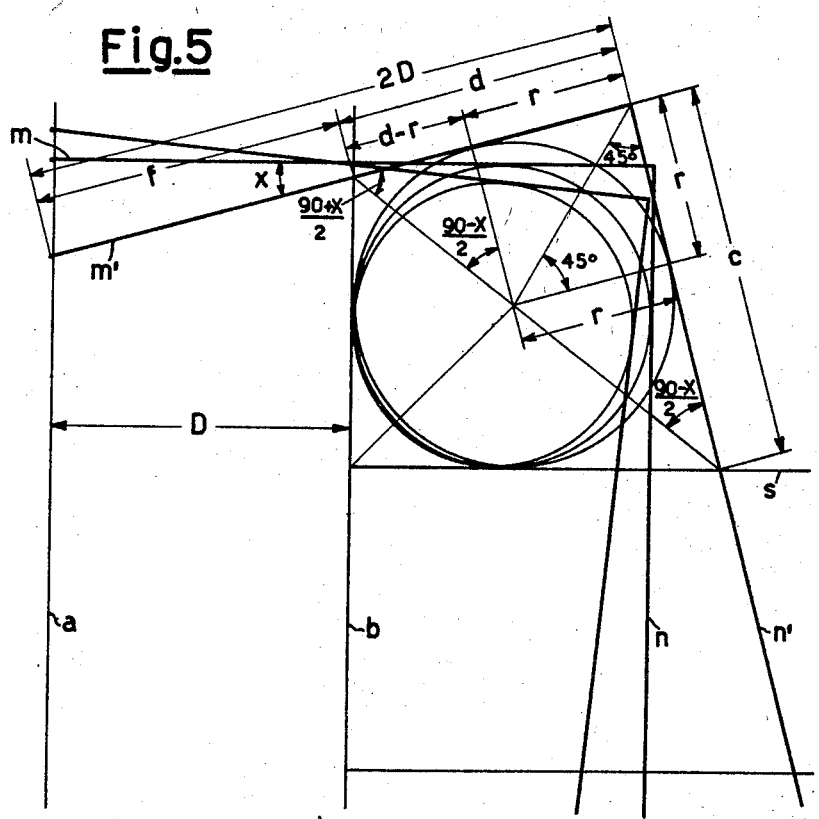
Fig. 5 is a geometrical diagram.

In Fig. 5, the whole of the two segments $m$, $n$ should be considered in position $m'$, $n'$, forming with position $m$, $n$, an angle $x$.

The side $d$ of said quadrilateral is then equal to $$d = 2D - f = 2D - D\frac{1}{\cos x} = D\left(2 - \frac{1}{\cos x}\right)$$

If the other side of the quadrilateral is called $c$ and $r$ is the radius of the inscribed circle, the similarity of triangles provides:

$$\frac{d}{c} = \frac{d-r}{r}$$

wherefrom $$r = \frac{cd}{c+d}$$

but since $$c = d\, tg\frac{90° + x}{2}$$

one gets:

$$r = d\frac{tg\dfrac{90°+x}{2}}{1 + tg\dfrac{90°+x}{2}}$$

and if substituting the value of $d$ as calculated previously $$r = D\left(2 - \frac{1}{\cos x}\right)\frac{tg\dfrac{90°+x}{2}}{1+tg\dfrac{90°+x}{2}}$$

The diameter $D_x$ of the circle to be inscribed in the said quadrilateral as a function of the angle $x$ is, therefore:

$$Dx = 2D\left(2 - \frac{1}{\cos x}\right)\frac{tg\frac{90°+x}{2}}{1+tg\frac{90°+x}{2}}$$

Figure 6:
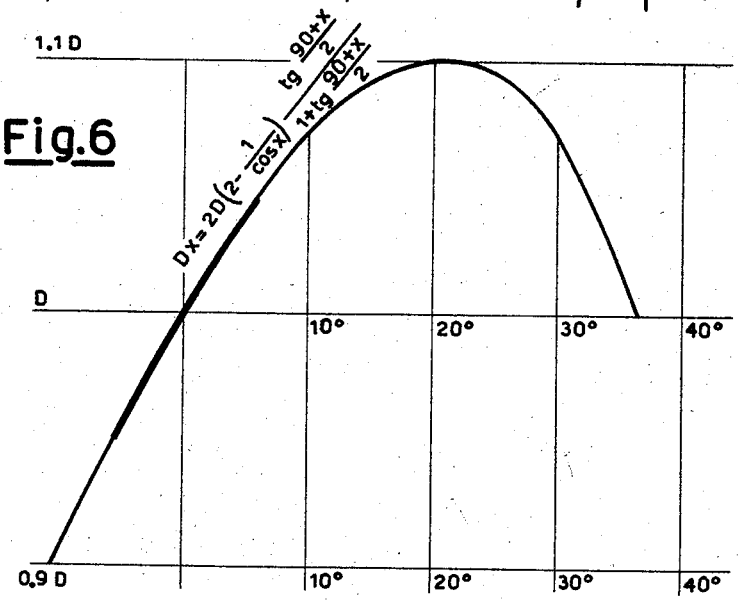
Fig. 6 shows the curve of the diameter variations allowable in the case of Figures 1 to 4.

Fig. 6 shows the curve of this function and therefrom one obtain that with an angle $x$ comprised between $-6°$ and $+6°$ approximately (thick-lined portion of the curve) a variation D of about 5% minus or plus is obtained.

The practical conclusion is that with perfectly tolerable inclinations of the rod forming the joint it is possible to obtain the perfect tightening of said joint even for diameter variations of the tube 1 beyond the widest allowances or tolerances of storehouse practice.

From Figures 2–5 it will be seen that also the curvature given to the rod at 4—4' should have a radius somewhat smaller than the tubes to be employed.

Of course the cross-section of the structure members 2 and 3 may be of any shape, while the structure member 1 should have a cross-section at least partly rounded or polygonal with elevated number of sides. The round shape however is the one most easily obtainable in the market.

What is claimed is:

1. A joint for joining three elongated structural members in substantially orthogonal relationship, comprising, in combination, a U-shaped connecting member having a substantially rectangular bend at a point spaced from the closed end and from the free end portions of said connecting member; a linking member adjustably secured to said free end portions of said connecting member; and an angular positioning member slidably secured to said connecting member and having two portions extending substantially perpendicularly from said connecting member at one location intermediate said closed end and said bend, and at another location on both of said free end portions of said connecting member, respectively, said angular member having an elongated inner seating surface extending transversely of said connecting member, each of said portions having an elongated outer seating surface extending perpendicularly to said inner seating surface.

2. A joint for joining three cylindrical structural members in substantially orthogonal relationship, comprising, in combination, a U-shaped connecting member having a substantially rectangular bend at a point spaced from the closed end and from the free end portions of said connecting member; a linking member adjustably secured to said free end portions of said connecting member; and an angular positioning member slidably secured to said connecting member and having two portions extending substantially perpendicularly from said connecting member at one location intermediate said closed end and said bend, and at another location on both of said free end portions of said connecting member, respectively, said angular member having a cylindrical inner seating surface extending transversely of said connecting member, each of said portions having a cylindrical outer seating surface extending perpendicularly to said inner seating surface.

3. A joint for joining three elongated structural members in substantially orthogonal relationship, comprising, in combination, a U-shaped connecting member having a substantially rectangular bend at a point spaced from the closed end and from the free end portions of said connecting member; a linking member adjustably secured to said free end portions of said connecting member; and an angular positioning member having two portions extending substantially perpendicularly from said connecting member at one location intermediate said closed end and said bend, and at another location on both of said free end portions of said connecting member, respectively, said angular member having an elongated inner seating surface extending transversely of said connecting member, each of said portions having an elongated outer seating surface extending perpendicularly to said inner seating surface, one of said portions being slidably secured to said connecting member and the other member being freely slidable thereon.

4. A substantially orthogonal arrangement of three connected elongated members, comprising, in combination, a U-shaped connecting member having a substantially rectangular bend at a point spaced from the closed end and from the free end portions of said connecting member; a linking member adjustably secured to said free end portions of said connecting member; a portion of a first elongated member intermediate the ends thereof, said portion being seated in the U-shaped portion of said connecting member and abutting thereagainst from the inside; a portion of a second elongated member intermediate the ends thereof, said portion being seated in said bend abutting against said connecting member and urged towards said first member by said connecting member; a third elongated member having an end abutting against said first member and seated between said end portions intermediate said linking member and said bend; and a positioning member slidably secured to said connecting member, said positioning member having a substantially angular cross-section with two portions disposed substantially at right angle to each other, one of said portions having an outer seating surface abutting against said first elongated member and an inner seating surface abutting against said second elongated member, the other of said portions having an outer seating surface abutting against said third elongated member and an inner seating surface abutting against said second elongated member.

5. A substantially orthogonal arrangement of three connected elongated members, comprising, in combination, a U-shaped connecting member having a substantially rectangular bend at a point spaced from the closed end and from the free end portions of said connecting member; a linking member adjustably secured to said free end portions of said connecting member; a portion of a first elongated member intermediate the ends thereof, said portion being seated in the U-shaped portion of said connecting member and abutting thereagainst from the inside; a portion of a second elongated member intermediate the ends thereof, said portion being seated in said bend abutting against said connecting member and urged towards said first member by said connecting member; a third elongated member having an end abutting against said first member and seated between said end portions intermediate said linking member and said bend; and a positioning member slidably secured to said connecting member, said positioning member having a substantially angular cross-section with two portions disposed substantially at right angle to each other, one of said portions having an outer seating surface abutting against and substantially mating said first elongated member and an inner seating surface abutting against and substantially mating said second elongated member, the other of said portions having an outer seating surface abutting against and substantially mating said third elongated member and an inner seating surface abutting against and substantially mating said second elongated member.

6. A substantially orthogonal arrangement of three connected cylindrical members, comprising, in combination, a U-shaped connecting member having a substantially rectangular bend at a point spaced from the closed end and from the free end portions of said connecting member; a linking member adjustably secured to said free end portions of said connecting member; a portion of a first cylindrical member intermediate the ends thereof, said portion being seated in the U-shaped portion of said connecting member and abutting thereagainst from the inside; a portion of a second cylindrical member intermediate the ends thereof, said portion being seated in said bend abutting against said connecting member and urged towards said first member by said connecting member; a third cylindrical member having an end abutting against said first member and seated between said end portions intermediate said linking member and said bend; and a positioning member slidably secured to said connecting member, said connecting member, said first and third cylindrical members, and said positioning member having a common plane of symmetry, said positioning member having in said plane of symmetry a substantially angular cross-section with two portions disposed substantially at right angle to each other, one of said portions having an outer seating surface abutting against and substantially mating said first cylindrical member and an inner seating surface abutting against and substantially mating said second cylindrical member, the other of said portions having an outer seating surface abutting against and substantially mating said third cylindrical member and an inner seating surface abutting against and substantially mating said second cylindrical member.

7. A joint structure, comprising, in combination, a first, a second, and a third elongated structural member in substantially orthogonal relationship, said first member having an end portion abutting in the direction of elongation of said first member against said second member so as to define a plane therewith, said third member longitudinally extending in a direction substantially perpendicular to said plane and being in abutting engagement with said first and second members; a U-shaped connecting member having a substantially rectangular bend at a point spaced from the closed end and from the free end portions of said connecting member; and a linking member adjustably secured to said free end portions of said connecting member, said closed end of said connecting member abutting against one of said elongated members defining said plane substantially in the direction of elongation of the other elongated member defining said plane, and said linking member abutting against said other elongated member substantially in the direction of elongation of said one elongated member, a portion of said connecting member intermediate said closed end and said free end portions thereof abutting against said third member for holding the latter in abutting engagement with said first and second elongated members.

8. A joint structure, comprising, in combination, a first, a second and a third substantially cylindrical structural member in substantially orthogonal relationship, said first member having an end portion abutting axially against said second member so as to define a plane therewith, said third member longitudinally extending in a direction substantially perpendicular to said plane and being in abutting engagement with said first and second members; a U-shaped connecting member having a substantially rectangular bend at a point spaced from the closed end and from the free end portions of said connecting member; and a linking member adjustably secured to said free end portions of said connecting member, said closed end of said connecting member abutting against one of said elongated members defining said plane substantially in the direction of the axis of the other elongated member defining said plane, and said linking member abutting against said other elongated member substantially in the direction of the axis of said one elongated member, a portion of said connecting member intermediate said closed end and said free end portions thereof abutting against said third member for holding the latter in abutting engagement with said first and second elongated members.

References Cited in the file of this patent

UNITED STATES PATENTS

| 2,164,094 | Tallman | June 27, 1939 |
| 2,201,608 | Causey | May 21, 1940 |

FOREIGN PATENTS

| 619,049 | Great Britain | Mar. 3, 1949 |
| 769,240 | Great Britain | Mar. 6, 1957 |
| 982,148 | France | June 4, 1951 |
| 1,045,973 | France | Dec. 2, 1953 |
| 1,064,552 | France | May 14, 1954 |
| 1,080,309 | France | Dec. 8, 1954 |